US012576336B2

(12) United States Patent
Takubo et al.

(10) Patent No.: US 12,576,336 B2
(45) Date of Patent: Mar. 17, 2026

(54) PROGRAM, METHOD, ELECTRONIC DEVICE, AND SYSTEM

(71) Applicant: CYGAMES, INC., Tokyo (JP)

(72) Inventors: Gen Takubo, Tokyo (JP); Emiko Katsuhara, Tokyo (JP); Ryohei Matsui, Tokyo (JP); Kazuhiro Oura, Tokyo (JP)

(73) Assignee: CYGAMES, INC., Tokyo (JP)

( * ) Notice: Subject to any disclaimer, the term of this patent is extended or adjusted under 35 U.S.C. 154(b) by 323 days.

(21) Appl. No.: 18/192,283

(22) Filed: Mar. 29, 2023

(65) Prior Publication Data

US 2023/0233937 A1     Jul. 27, 2023

Related U.S. Application Data

(63) Continuation of application No. PCT/JP2021/035791, filed on Sep. 29, 2021.

(30) Foreign Application Priority Data

Sep. 30, 2020   (JP) ................................. 2020-165168

(51) Int. Cl.
*A63F 13/00* (2014.01)
*A63F 13/52* (2014.01)
*A63F 13/537* (2014.01)

(52) U.S. Cl.
CPC ............ *A63F 13/52* (2014.09); *A63F 13/537* (2014.09)

(58) Field of Classification Search
CPC ........ A63F 13/795; A63F 13/79; A63F 13/69; A63F 13/847; A63F 13/44
See application file for complete search history.

(56) References Cited

U.S. PATENT DOCUMENTS

| | | | | |
|---|---|---|---|---|
| 2011/0212783 A1* | 9/2011 | Dale | ..................... | A63F 13/798 |
| | | | | 463/42 |
| 2012/0157212 A1* | 6/2012 | Kane | ..................... | G06F 3/0482 |
| | | | | 463/42 |
| 2012/0220377 A1* | 8/2012 | Cantor | .................. | A63F 13/795 |
| | | | | 463/42 |

FOREIGN PATENT DOCUMENTS

| | | |
|---|---|---|
| JP | 5463436 B1 | 4/2014 |
| JP | 2016-202665 A | 12/2016 |
| JP | 2018-055647 A | 4/2018 |

OTHER PUBLICATIONS

International Search Report issued in PCT/JP2021/035791 on Nov. 30, 2021 (5 pages).
Written Opinion of the International Searching Authority issued in PCT/JP2021/035791 on Nov. 30, 2021 (4 pages).

(Continued)

*Primary Examiner* — David L Lewis
*Assistant Examiner* — Eric M Thomas
(74) *Attorney, Agent, or Firm* — Osha Bergman Watanabe & Burton LLP

(57) ABSTRACT

An electronic device includes a display device and executes a game. The electronic device further executes content of the game and makes the display device display a screen related to the content. The electronic device further determines whether a release condition for allowing second content different from first content to be executable has been satisfied, on the basis of execution of the first content. The display device further displays a screen related to the second content while displaying a main screen related to the first content, in response to determining that the release condition has been satisfied.

8 Claims, 9 Drawing Sheets

(56) References Cited

OTHER PUBLICATIONS

Office Action issued in corresponding Japanese Patent Application No. 2020-165168, mailed on Sep. 21, 2021 (7 pages).
Office Action issued in corresponding Japanese Patent Application No. 2020-165168, mailed on Dec. 20, 2021 (6 pages).

\* cited by examiner

PROGRAM, METHOD, ELECTRONIC DEVICE, AND SYSTEM

TECHNICAL FIELD

The present invention relates to a program etc., and, in particular, relates to a program etc. for a game for executing a plurality of items of game content.

BACKGROUND ART

In recent years, electronic devices, such as smartphones, have rapidly become more widespread, and a large number of games to be executed on such electronic devices have been released. Among these kinds of games, there are known games that each include an item of game content in which a game medium of a player battles with an enemy game medium and a item of game content in which the player can purchase a game medium to be used in the game (for example, see Patent Literature 1).

CITATION LIST

Patent Literature

{Patent Literature 1} Publication of Japanese Patent No. 5463436

SUMMARY OF INVENTION

Technical Problem

In the related art, in a game in which, on the basis of the result of executing an initial item of content of the game, another item of content becomes executable, there are cases in which a screen transition is made from a screen related to the initial item of content to a screen related to the other item of content. That is, the screen related to the initial item of content disappears from a display screen of an electronic device, and the screen related to the other item of content is displayed thereon. Thus, in the case where a player wants to play the initial item of content, the player needs to reselect the initial item of content again, thus disturbing the tempo at which the game proceeds. As a result, a player's sense of immersion in the game is lost, in some cases.

The present invention has been made in order to solve such a problem, and an object thereof is to provide a program, a method, an electronic device, and a system with which a player's sense of immersion in a game can be maintained.

Solution to Problem

According to one aspect, the present invention provides a program for a game to be executed on an electronic device including a display device, the program causing the electronic device to function as: a game control means that executes content of the game and that makes the display device display a screen related to the content; and a determination means that determines whether a release condition for allowing second content different from first content to be executable has been satisfied, on the basis of execution of the first content performed by the game control means, wherein the game control means executes the first content and makes the display device display a main screen related to the first content, and makes the display device display a screen related to the second content while making the display device display the main screen related to the first content, in the case where the determination means determines that the release condition has been satisfied.

According to another aspect, the present invention provides a method for a game to be executed on an electronic device including a display device, the method including: a game control step for executing content of the game and making the display device display a screen related to the content; and a determination step for determining whether a release condition for allowing second content different from first content to be executable has been satisfied, on the basis of execution of the first content performed in the game control step, wherein, in the game control step, the first content is executed, and the display device is made to display a main screen related to the first content, and, in the case where it is determined that the release condition has been satisfied in the determination step, the display device is made to display a screen related to the second content while being made to display the main screen related to the first content.

According to still another aspect, the present invention provides an electronic device that includes a display device and that executes a game, the electronic device including: a game control means that executes content of the game and that makes the display device display a screen related to the content; and a determination means that determines whether a release condition for allowing second content different from first content to be executable has been satisfied, on the basis of execution of the first content performed by the game control means, wherein the display device displays a screen related to the second content while displaying a main screen related to the first content, in the case where the determination means determines that the release condition has been satisfied.

According to still another aspect, the present invention provides a system for a game to be executed on an electronic device including a display device, the system including: a game control means that executes content of the game and that makes the display device display a screen related to the content; and a determination means that determines whether a release condition for allowing second content different from first content to be executable has been satisfied, on the basis of execution of the first content performed by the game control means, wherein the game control means executes the first content and makes the display device display a main screen related to the first content, and makes the display device display a screen related to the second content while making the display device display the main screen related to the first content, in the case where the determination means determines that the release condition has been satisfied.

Advantageous Effects of Invention

According to the present invention, it is possible to maintain a player's sense of immersion in a game.

DESCRIPTION OF EMBODIMENTS

A game system according to an embodiment of the present invention will be described below with reference to the accompanying drawings. In this specification, for convenience of description, there are cases where descriptions that are more detailed than necessary are omitted. For example, there are cases where detailed descriptions of matters that are already well known and repeated descriptions of substantially the same configurations are omitted.

Although this game system can be realized by a system in which a plurality of electronic devices are connected via a network, this game system can also be realized by one electronic device. First, a description will be given of an embodiment realized by one electronic device, and then, a system connected to the network will be described.

Embodiment Realized by Electronic Device

[Configuration]

Figure 1:
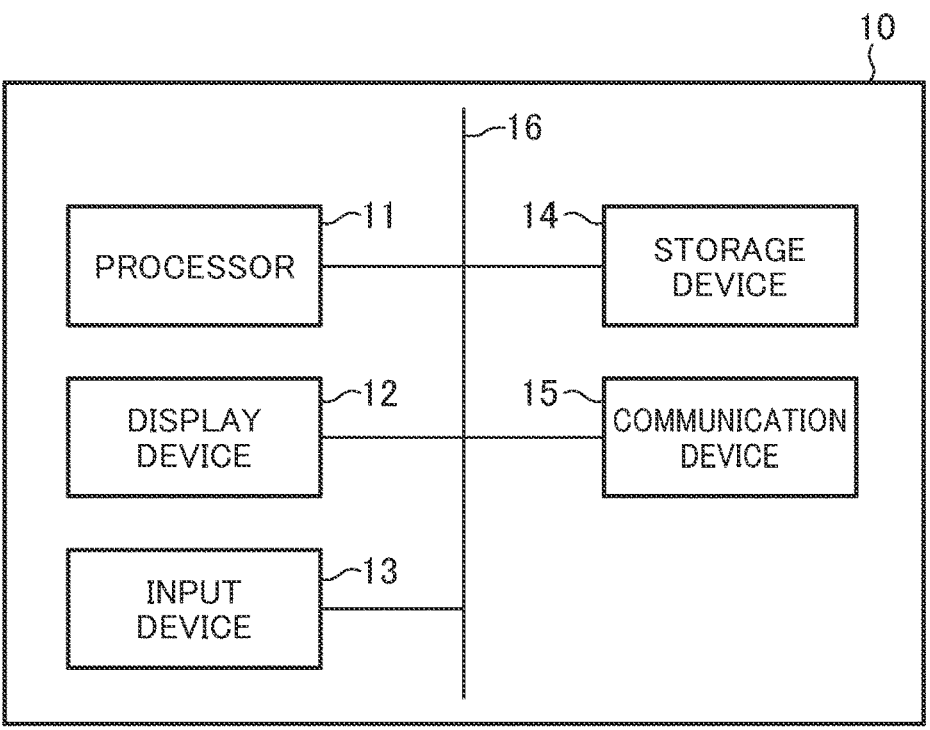
FIG. 1 is a block diagram showing the hardware configuration of an electronic device according to one embodiment of the present invention.

FIG. 1 is a block diagram showing the hardware configuration of an electronic device 10 according to one embodiment of the present invention. The electronic device 10 includes a processor 11, an input device 12, a display device 13, a storage device 14, and a communication device 15. These individual constituent devices 11 to 15 are connected via a bus 16. Note that interfaces may be interposed as needed between the bus 16 and the individual constituent devices 11 to 15. In this embodiment, the electronic device 10 is a smartphone. Alternatively, the electronic device 10 may be a computer, such as a tablet computer, a laptop personal computer, and a desktop computer, as long as the computer includes the configuration described above.

The processor 11 controls the overall operation of the electronic device 10 and is, for example, an electronic circuit such as a CPU or an MPU. The processor 11 executes various kinds of processing by loading programs and data stored in the storage device 14 and executing the programs. In one example, the processor 11 is constituted of a plurality of processors.

The input device 12 is a user interface for accepting inputs to the electronic device 10 from a user; for example, the input device 12 is a touch panel, a touchpad, a keyboard, or a mouse. Since the electronic device 10 of this embodiment is a smartphone, the electronic device 10 includes a touch panel, and the touch panel can also be a touchscreen and also functions as the input device 12 and the display device 13. The input device 12 and the display device 13 may have separate forms disposed at different positions.

The display device 13 displays application screens etc. to a user of the electronic device 10, that is, a player, under the control of the processor 11. A liquid crystal display, an organic EL display, or a plasma display can be used as the display device 13.

The storage device 14 is a storage device that includes a main memory, a buffer memory, and a storage and that is included in a general smartphone or computer, such as a magnetic storage device and a storage device that use a RAM, which is a volatile memory, and a flash memory, which is a non-volatile memory, such as an eMMC, a UFS, or an SSD. The storage device 14 may include an external memory. The storage device 14 stores, for example, a game application. The game application includes a game program for executing a game and various kinds of data to be referred to when the game program is executed. The game program is activated in accordance with an operation of the user with respect to the electronic device 10, and is executed on an operating system (OS) implemented in advance in the electronic device 10.

In one example, the storage device 14 includes a main storage device and an auxiliary storage device. The main storage device is a volatile storage medium that allows high-speed reading and writing of information, and is used as a storage area and a work area when the processor 11 processes information. The auxiliary storage device stores various programs and data that is used by the programs when the programs are executed. Although the auxiliary storage device is, for example, an SSD or a hard disk device, the auxiliary storage device may be any type of non-volatile storage or non-volatile memory that is capable of storing information and may be detachable. The auxiliary storage device stores, for example, an operating system (OS), middleware, application programs, and various kinds of data that may be referred to when these programs are executed.

The communication device 15 sends data to and receives data from another computer, such as a server, via a network. For example, the communication device 15 performs wireless communication, such as mobile communication or wireless LAN communication, to connect to the network. In one example, the electronic device 10 downloads a program from a server by means of the communication device 15 and stores the program in the storage device 14. Alternatively, the communication device 15 may perform wired communication using an Ethernet (registered trademark) cable or the like. In the case where data is not sent to or received from another computer, the electronic device 10 need not include the communication device 15.

Figure 2:
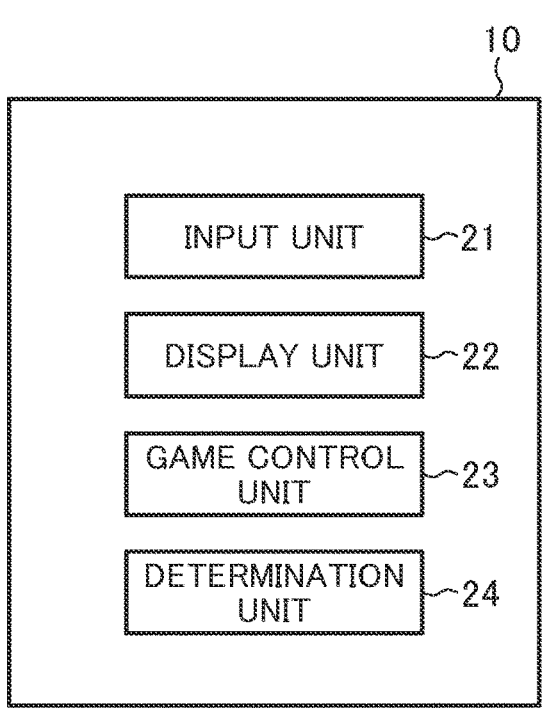
FIG. 2 is an example functional block diagram of the electronic device according to the embodiment of the present invention.

FIG. 2 is an example of a functional block diagram of the electronic device 10 according to the embodiment of the present invention. The electronic device 10 includes an input unit 21, a display unit 22, a game control unit 23, and a determination unit 24. In this embodiment, these functions are realized when the processor 11 executes a program. For example, the program to be executed is the game program stored in the storage device 14 or received via the communication device 15. Since the various kinds of functions are realized by loading the program, as described above, a portion or the entirety of one part (function) may be included in another part. The various kinds of functions are realized as individual means through execution of the program. Alternatively, these functions may be realized by means of hardware by configuring electronic circuits or the like each realizing a portion or the entirety of each of the functions.

The input unit 21 is configured by using the input device 12, and accepts inputs to the electronic device 10 from the user. In this embodiment, a touch detection function included in the touch panel and generally provided in a smartphone can be used. The display unit 22 is configured by using the display device 13 and displays, on the display device 13, game screens in accordance with the proceeding of a game and user operations.

The game control unit 23 performs basic control when the game of this embodiment is executed. The game control unit 23 is configured to include the processor 11, executes items of content of the game (hereinafter, also simply referred to as "game content" or "content"), and makes the display device 13 display screens related to the items of content. Execution of an item of game content by the game control unit 23 can include: acquisition of information required for the execution from the storage device 14 or acquisition of player's operation information via the input device 12; information processing for the item of game content on the basis of the required information; and generation and/or acquisition of information required for display of a screen related to the item of content to be displayed on the display device 13, on the basis of the information processing.

The game has a plurality of items of game content executed by using one or a plurality of game media. The items of game content can be played by the player in the game and include: for example, a quest; a mission; a mini game; development, strengthening, and synthesizing of a game medium; a lottery game; a game-media purchase shop; a virtual-space exploration event; and a battle event with an opponent (for example, another user). A game medium is electronic data used in the game, such as a character, a card, as well as an item like a weapon, an equipment item, and a recovery item. The game content is the content of the game realized through execution of the program related to the game, and executing the game content specifically means executing the program related to the game. The game-medium purchase shop includes a normal shop in which the player can always purchase an item during the game and a limited shop that is released for a limited period.

The game of this embodiment has first content and second content as a plurality of items of game content. In this embodiment, the first content includes a quest and a lottery game. The quest may include one quest or a plurality of quests as one set of quests. One or more predetermined game challenges to be achieved by the player are set in the quest. A game challenge in this embodiment is that one or a plurality of game media selected by the player battle with one or a plurality of predetermined enemy game media and defeat the enemy game media to win. In this case, the game media are characters in one example and are respectively stored in the storage device 14 in association with IDs that uniquely identify the characters, images that indicate the characters and that are displayed on the display device 13, objects, and characteristic information. The characteristic information is information indicating the characteristics of the game media, for example, information related to skills and parameters indicating the abilities of the characters.

The game control unit 23 may give a reward to the player when the player achieves the game challenge, i.e., clears the quest. The reward is a game medium that can be used in the game by the player and is, here, an item, such as a recovery item or an equipment item, and/or virtual currency that can be used in the game.

The lottery game is lottery processing executed in accordance with the fact that the quest has been cleared. The lottery processing is processing for setting the lottery result to a win or a loss at random or in a predetermined pattern. In the case where the quest is made up of a plurality of quests, the lottery game may be performed every time each of the quests is cleared, or the lottery game may be performed after one set of quests made up of the plurality of quests is cleared. In the case where the lottery result shows a win, the game control unit 23 executes the second content. In the case where the lottery result shows a loss, the game control unit 23 does not perform any processing, for example, and waits for a player's operation input for executing the quest again, for example, or makes the display device 13 display a message indicating that the lottery result is a loss.

Figure 3:
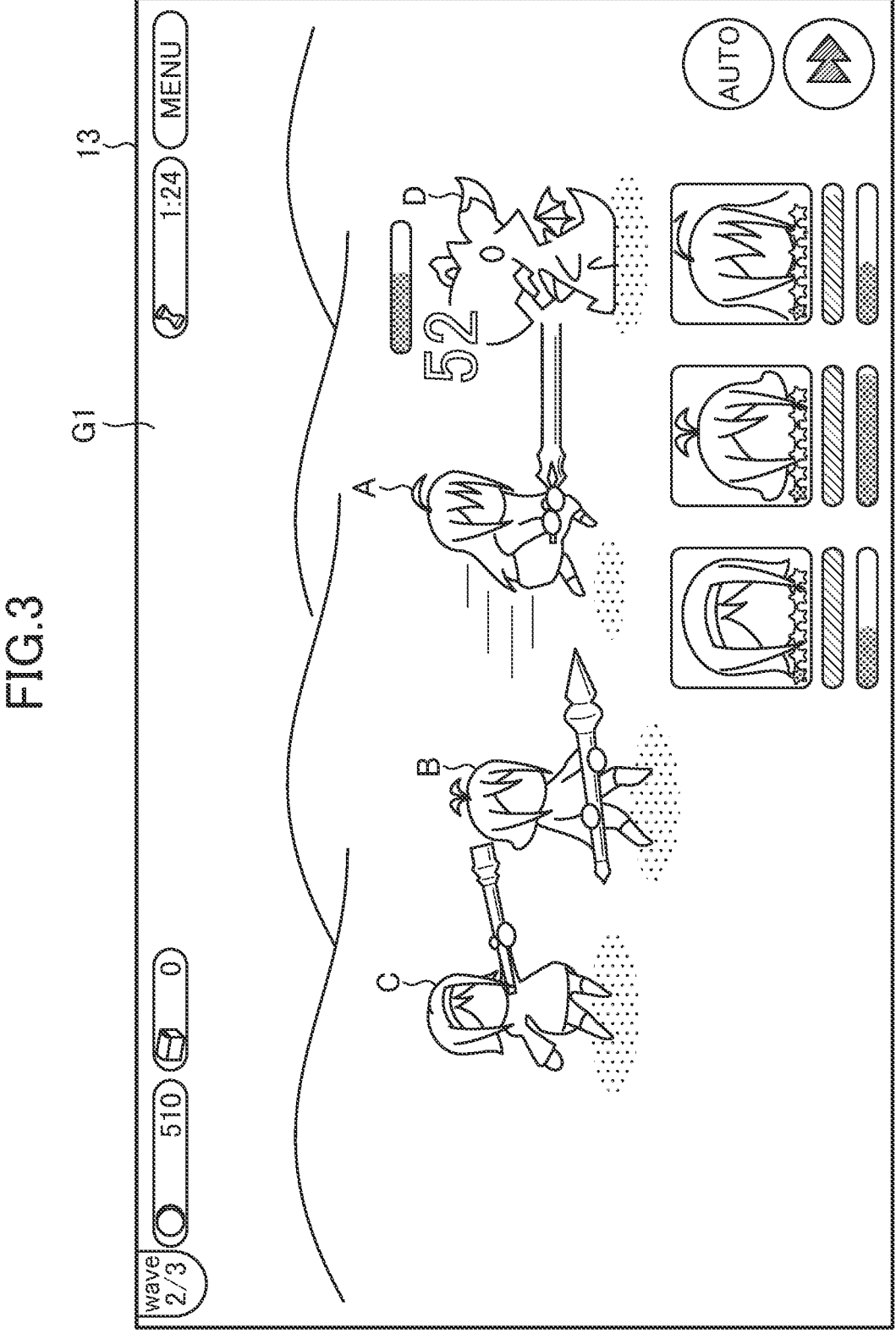
FIG. 3 is a view showing one example of a main screen related to first content.

The game control unit 23 executes the first content and makes the display device 13 display a main screen G1 related to the first content. The main screen G1 related to the first content of this embodiment includes a selection screen for allowing the player to select one quest from among a plurality of quests that make up the first content, an organization screen for selecting characters to be made to participate in the quest, a screen for showing the proceeding of the quest, and a screen for showing that a quest is cleared (quest clear), and can be set to at least any of these screens. In one example, the game control unit 23 generates data required for display of the main screen G1 through execution of the first content and makes the display device 13 display the main screen G1 on the basis of this data. Accordingly, the main screen G1 is sequentially switched to the individual screens on the basis of the proceeding of the first content. That is, execution of the first content by the game control unit 23 includes: acquisition of information related to the first content (for example, information related to characters used in the quest) from the storage device 14; and execution of processing for making the first content proceed on the basis of the acquired information, to generate information to be displayed on the screen related to the first content. FIG. 3 is a view showing one example of the main screen G1 related to the first content. The example of the main screen G1 shown in FIG. 3 is a screen showing the proceeding of the quest and shows a state in which a plurality of characters A to C selected by the player are attacking an enemy character D.

In this embodiment, unlike the first content, the second content includes a shop in which, among items used in the game by the player, at least limited items can be purchased. The game in this case is a quest in one example. In another example, it is also possible that a limited item purchased in the second content is used before execution of the first content, to enhance a character of the player to be used in the first content. The second content of this embodiment is a limited shop released for a limited period when the lottery game in the first content is won. In the limited shop, limited items that are not available for purchase in the normal shop are available for purchase. The limited items can include, for example, a recovery item for recovering the stamina of a character of the player and an equipment item to be equipped on a character of the player. The limited items can include items that are used in the first content and that can recover or enhance a character of the player.

In the case where the determination unit 24 determines that a release condition for executing the second content has been satisfied, as will be described later, the game control unit 23 makes the display device 13 display a screen related to the second content while making the display device 13 display the main screen G1 related to the first content. For example, in the case where the determination unit 24 determines that the release condition has been satisfied, the game control unit 23 obtains information required for display of the screen related to the second content from the storage device 14 and makes the display device 13 display the screen related to the second content on the basis of this information. Here, this information can include: names of items, including limited items that can be purchased in the limited shop; images of the items; item information including currency amounts required to purchase the items; and information indicating a display format of the item information.

Figure 4:
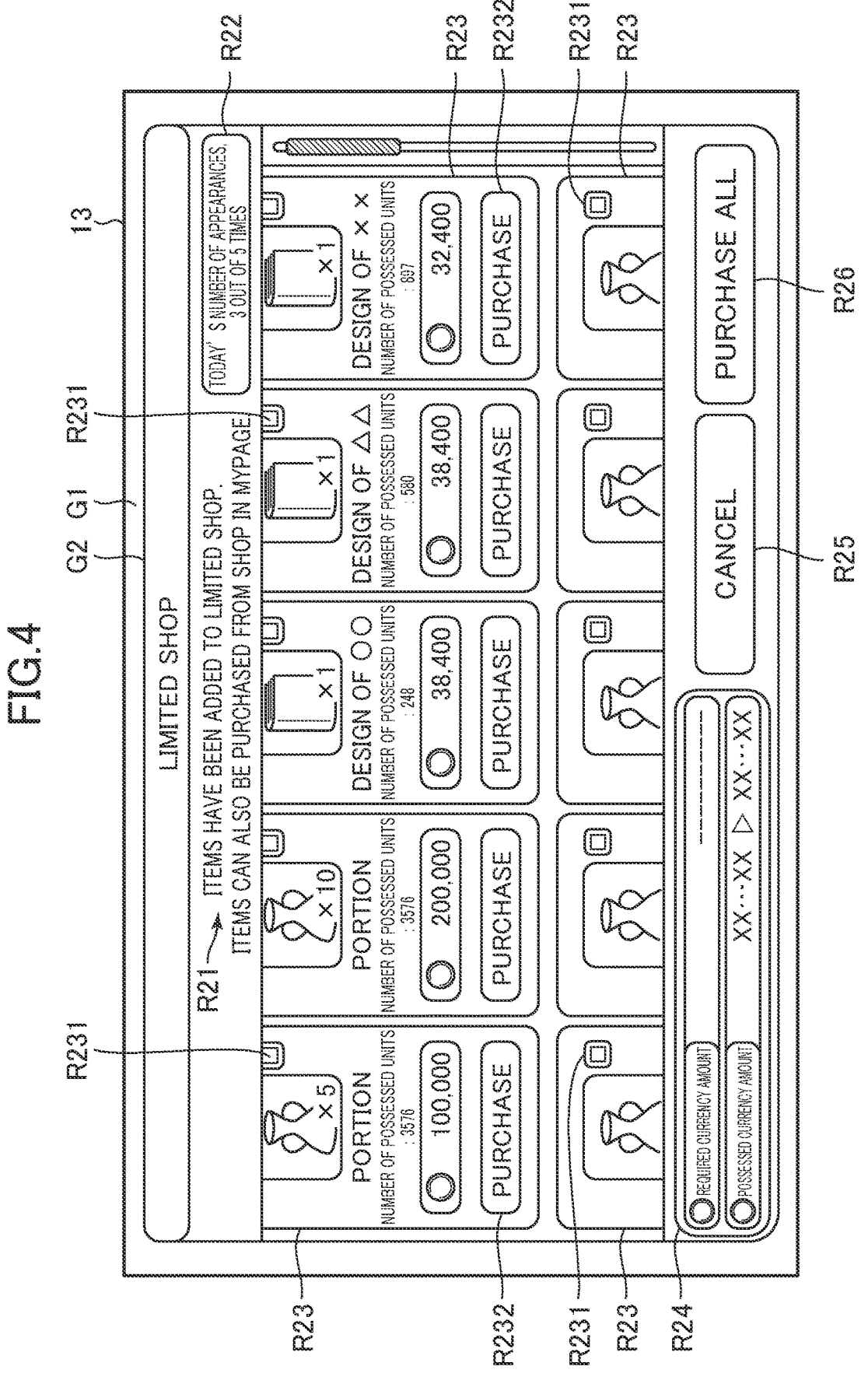
FIG. 4 is a view showing one example of a pop-up screen related to second content.

In one example of a display mode of the screen related to the second content, the game control unit 23 makes the display device 13 display the screen related to the second content, in the main screen G1. In another example, the game control unit 23 splits the display screen of the display device 13 for the main screen G1 and the screen related to the second content and makes the display device 13 display those screens. In this embodiment, as shown in FIG. 4, the game control unit 23 makes the display device 13 superimpose a pop-up screen G2 related to the second content on the main screen G1 related to the first content. In these display modes of the screen related to the second content, the main screen G1 can be set to a screen related to the first content, such as a screen showing quest clear indicating that the player has won a battle in the quest or a screen showing quest clear, including notification of granting of a reward, for example.

The pop-up screen G2 is a user interface with which the player can purchase a limited item. The pop-up screen G2 includes a limited-shop notification region R21, a limited-shop release-count display region R22, item-information display regions R23 related to items that can be purchased by the player, a currency-amount display region R24, a cancel button R25, and a selected-item purchase button R26.

The limited-shop notification region R21 is a display region for notifying the player that the limited shop has been released. Furthermore, it is also possible to display, in the limited-shop notification region R21, a predetermined method by which the limited shop can be used even after the pop-up screen G2 is closed. In the example shown in FIG. 4, it is notified that the limited shop can be used from "shop" in "my page", which is a home screen. In this case, in one example, a button for screen transition to the limited shop is displayed in a "my page" screen.

The limited-shop release-count display region R22 is a region for displaying the number of times the limited shop is released. In the example shown in FIG. 4, it is indicated that this is the third time to release the limited shop in the case where the limited shop can be released five times at most during the limited period.

The item-information display regions R23 are displayed in the pop-up screen G2 for individual items, and each of the item-information display regions R23 includes and displays, therein, the name of an item that can be purchased by the player, an image of the item, the number of units of the item to be purchased, the number of player-possessed units of the item, the currency amount required for purchase, a selection box R231, and a purchase button R232. Although the items are limited items, normal items may also be included therein. The limited items are each an item of which the type or of which the number of units to be purchased is not available in the normal shop, for example, and the limited items can include a recovery item for recovering the stamina of a character of the player and an equipment item to be equipped on a character of the player. The limited items just need to be differentiated from items that can be purchased in the normal shop. Normal items are items that can be purchased in the normal shop, and can include a recovery item and an equipment item. The selection box R231 is used to accept player's selection of the item corresponding to the item-information display region R23. For example, the selection box R231 is in an unselected state when the limited shop is released and is set in a selected state, in which a check mark is displayed, through a player's selection operation. Furthermore, the check mark becomes invisible through another player's selection operation, whereby the selection box R231 is set in the unselected state. The purchase button R232 is a button for purchasing the item corresponding to the item-information display region R23.

In the currency-amount display region R24, the currency amount possessed by the player and the total currency amount required to purchase selected items are displayed. The cancel button R25 is a button for deselecting all items selected in the selection boxes R231. The selected-item purchase button R26 is a button for executing purchase of all items selected in the selection boxes R231.

Figure 5:
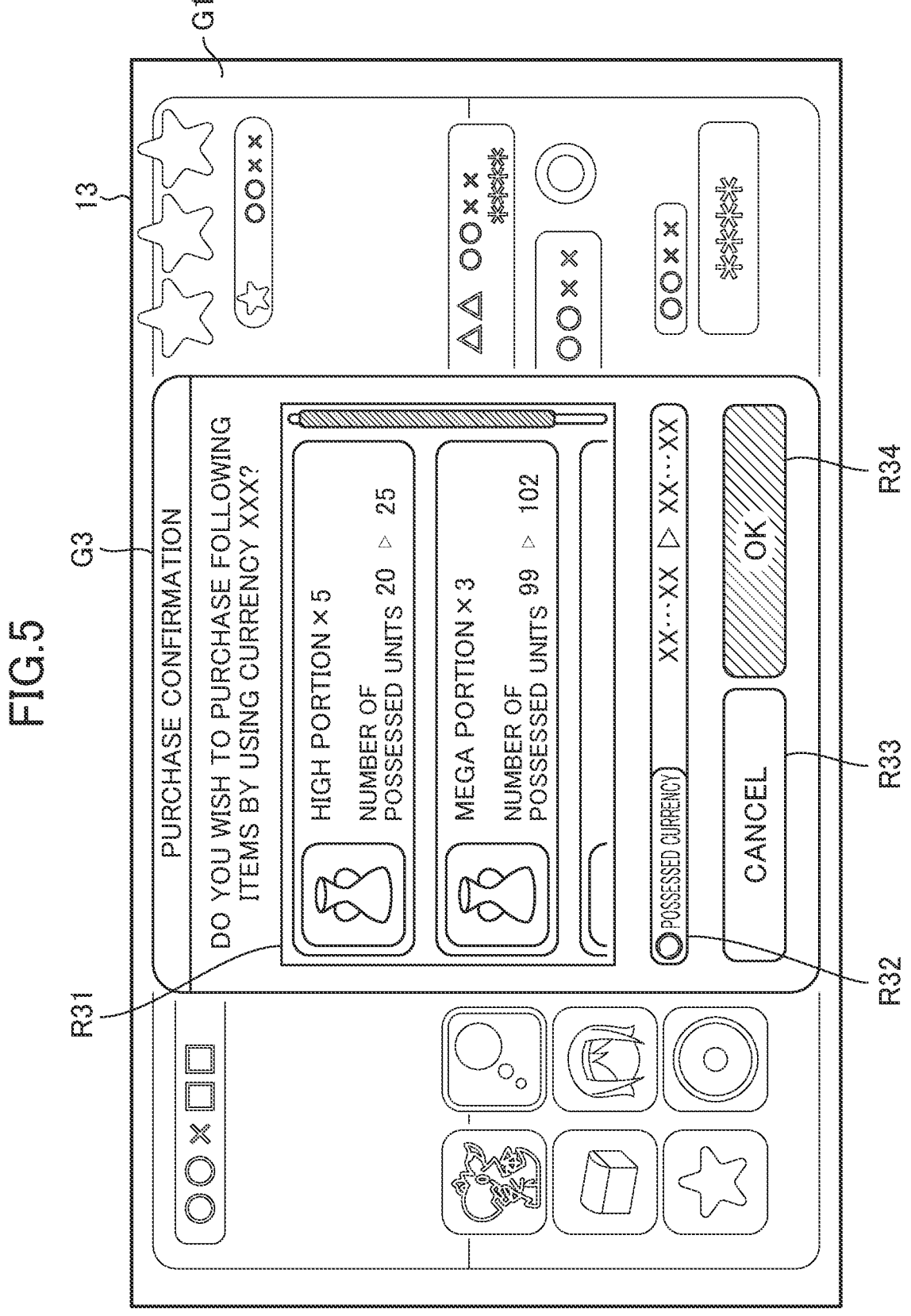
FIG. 5 shows one example of a purchase confirmation screen.

When the purchase button R232 or the selected-item purchase button R26 is pressed by the player, the game control unit 23 makes the display device 13 display a purchase confirmation screen G3 shown in FIG. 5. In the example shown in FIG. 5, although the purchase confirmation screen G3 is superimposed on the main screen G1, it is also possible to use a display mode similar to any of the above-described display modes of the screen related to the second content. The purchase confirmation screen G3 includes and displays, therein, a selected-item information display region R31 related to items selected by the player, a possessed-currency-amount display region R32, a cancel button R33, and a consent button R34.

Figure 6:
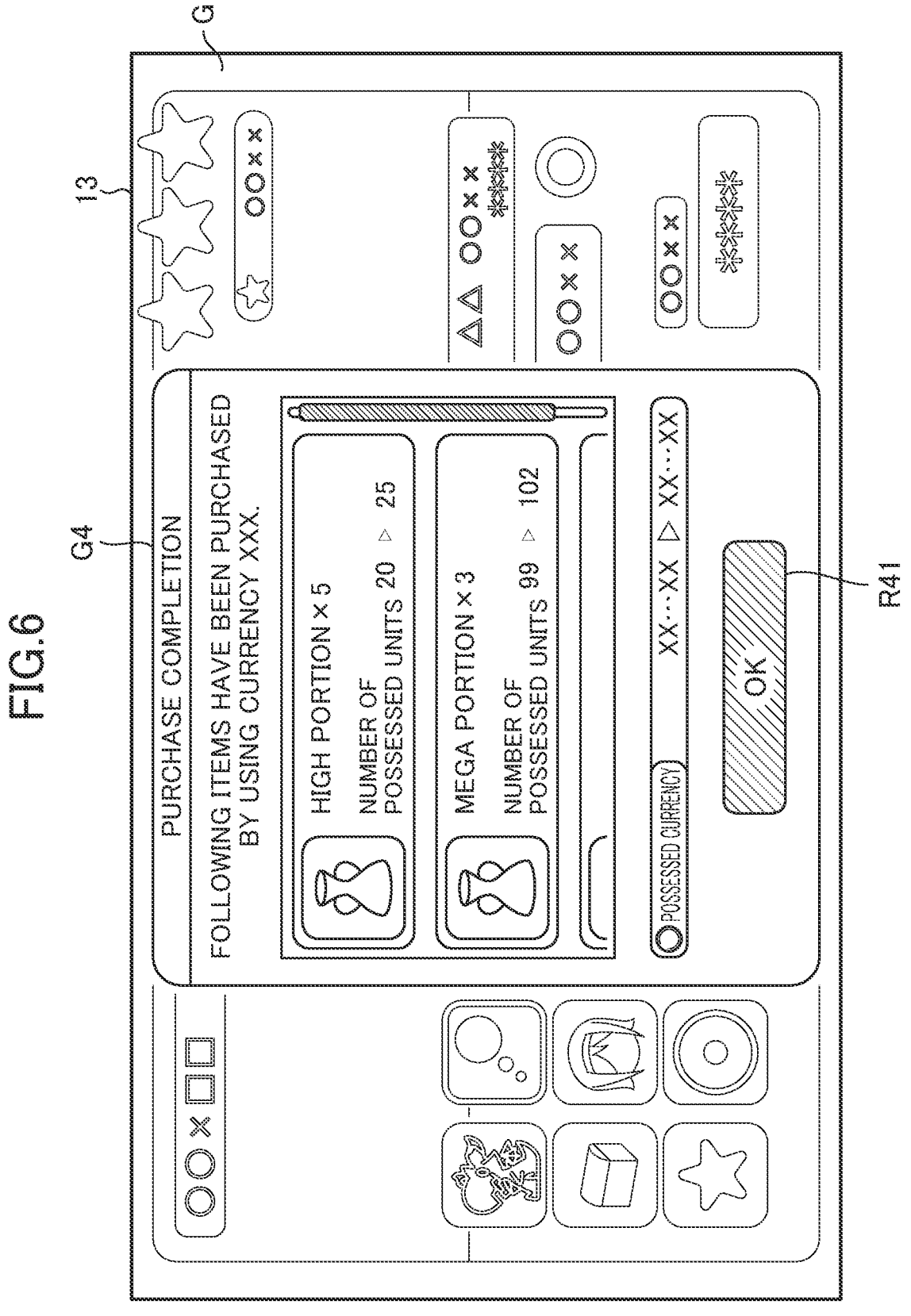
FIG. 6 shows one example of a purchase completion screen.

The selected-item information display region R31 includes and displays, therein, the name of each selected item, an image of the item, the number of units of the item to be purchased, the number of player-possessed units of the item before purchase, and the number of player-possessed units of the item after purchase. The possessed-currency-amount display region R32 includes and displays, therein, the currency amount possessed by the player before purchase and the currency amount possessed by the player after purchase. The cancel button R33 is a button for selecting not to purchase all selected items, and, when the button R33 is pressed, the game control unit 23 makes the pop-up screen G2 displayed again on the main screen G1. The consent button R34 is a button for consenting to purchase all selected items, and, when the button R34 is pressed, the game control unit 23 gives the purchased items to the player in the case where the currency amount possessed by the player is equal to or greater than the amount required for purchase, and makes the display device 13 display a purchase completion screen G4, as shown in FIG. 6. The purchase completion screen G4 includes and displays, therein, the name of each purchased item, an image of the item, the number of purchased units of the item, the number of player-possessed units of the item after purchase, and a close button R41. The close button R41 is a button for closing the pop-up screen G2, and, when the button R41 is pressed, the pop-up screen G2 disappears from the main screen G1, and the main screen G1 becomes fully visible. On the other hand, in the case where the currency amount possessed by the player is less than the amount required for purchase, the game control unit 23 makes the display device 13 display notification of unavailability.

The game control unit 23 may make the pop-up screen G2 having the same content, such as the types of items, displayed every time the lottery game in the first content is won, or, as in this embodiment, the game control unit 23 may change the limited items in the second content (limited shop) every time the lottery game in the first content is won, and may make the changed items displayed in the pop-up screen G2. This change in the limited items can include addition of new limited items to the lineup of the above-mentioned limited items and a change to a completely new lineup of limited items. In the case where new limited items are added to the above-mentioned limited items, in one example, limited items (the item-information display regions R23) in the pop-up screen G2 are displayed in the following order, newly added recovery items, newly added equipment items (in ascending order of the number of player-possessed units of each of the items), recovery items that were available up to the last limited shop, and equipment items that were available up to the last limited shop (in ascending order of the number of player-possessed units of each of the items), such that those items are displayed preferentially at conspicuous positions. Furthermore, every time the lottery game in the first content is won, the game control unit 23 may change the limited items in the second content (limited shop) and make the changed items displayed in the pop-up screen G2. Furthermore, the display order of items in the screen related to the second content (for example, the pop-up screen G2) may be changed in accordance with a player's setting operation in another screen, such as an option screen. Furthermore, regarding the display order of items, the items may be displayed in ascending order of the number of player-possessed units of each of the items or in descending order of rarity set for each of the items, irrespective of whether new items are added or not.

The game control unit 23 can execute the second content only during the limited period. In one example, the limited period can be set to a predetermined period (for example, for five minutes, ten minutes, one hour, or one day) after the second content is released (that is, after the second content becomes executable). The limited period of this embodiment is set to a period from the time when the second content is released to 5:00 am on the next day after the date to which the time when the second content is released belongs. Specifically, in one example, after the lottery game included in the first content is won, the game control unit 23 receives release permission information for the second content from the determination unit 24, as will be described later, and allows the second content to be executed. To allow the second content to be executed means to make a transition to a state in which an operation input related to the second content can be accepted from the player. In one example, the time when the game control unit 23 receives release permission information for the second content from the determination unit 24 can be set to the beginning of the limited period. Furthermore, after one limited period has elapsed, the game control unit 23 can reset the beginning of this limited period. In this embodiment, after 5:00 am on the next day of the date on which release permission information for the second content is received, the game control unit 23 can store the receipt date and time of release permission information for the second content to be released next. The game control unit 23 determines whether the time of a player operation input related to the second content falls within the limited period. In the case where the time of the operation input falls within the limited period, the game control unit 23 accepts this operation input as a valid input and executes the second content. In the case where the time of the operation input does not fall within the limited period, the game control unit 23 treats this operation input as an invalid input and does not accept this operation input, whereby the second content is not executed.

The game control unit 23 counts the number of times the release condition is satisfied during the limited period. In one example, the game control unit 23 stores the number of times of reception of release permission information for the second content from the determination unit 24, in the storage device 14 such as a memory, reads the number of times of reception from the storage device 14 when new release permission information for the second content is received, increments the number of times of reception, and stores the result in the storage device 14. The game control unit 23 determines whether the number of times of reception of release permission information for the second content during the limited period (more specifically, the number of times of reception as a result of incrementation performed when new release permission information is received) is equal to or less than the maximum release count for the second content, stored in advance in the storage device 14. In the case where this number of times of reception is equal to or less than the maximum release count, the game control unit 23 executes the second content. On the other hand, in the case where this number of times of reception exceeds the maximum release count, the game control unit 23 does not execute the second content, and then may perform no processing or may display a message indicating that the number of times of reception exceeds the maximum release count, on the main screen G1.

Specifically, in one example, the game control unit 23 first determines whether the number of times of reception of the release permission information for the second content from the determination unit 24 during the limited period is equal to or less than the maximum release count. In the case where the number of times of reception is equal to or less than the maximum release count, the game control unit 23 determines whether this number of times of reception is 1. In the case where this number of times of reception is 1, the game control unit 23 stores the reception time in the storage device 14 as the beginning of the limited period, executes the second content, and decides limited items to be displayed in the screen related to the second content. The limited items can be decided from, for example, a limited-item list stored in advance in the storage device 14. In the case where the number of times of reception is not 1 (that is, in the case where the number of times of reception during the limited period is equal to or greater than 2 and is equal to or less than the maximum release count), the game control unit 23 increments the number of times of reception, stores the resultant in the storage device 14, executes the second content, and decides limited items to be displayed in the screen related to the second content. At the time of this decision, it is possible to decide limited items from a plurality of limited-item lists that are stored in advance in the storage device 14 and are different from each other or to decide additional items from among additional candidate items by lottery or by a predetermined rule and add the additional items to a lineup of a limited-item list displayed for the first time. In this way, every time the second content is released (executed) during the limited period, the game control unit 23 can add limited items that were not available the last time and can make the limited items displayed in the item-information display regions R23 in the pop-up screen G2. In this case, the release condition is a condition to release the second content, at the time of the first lottery win, and is also a condition to change components such as limited items included in the second content, at the time of the second lottery win to the win corresponding to the maximum release count.

The game control unit 23 may close the pop-up screen G2 after or before the purchase of a limited item(s), in accordance with a player's operation input. It is also possible that the game control unit 23 makes the display device 13 display a shop screen G20, as shown in FIG. 7, during the limited period even after the pop-up screen G2 is closed, and executes the second content.

Figure 7:
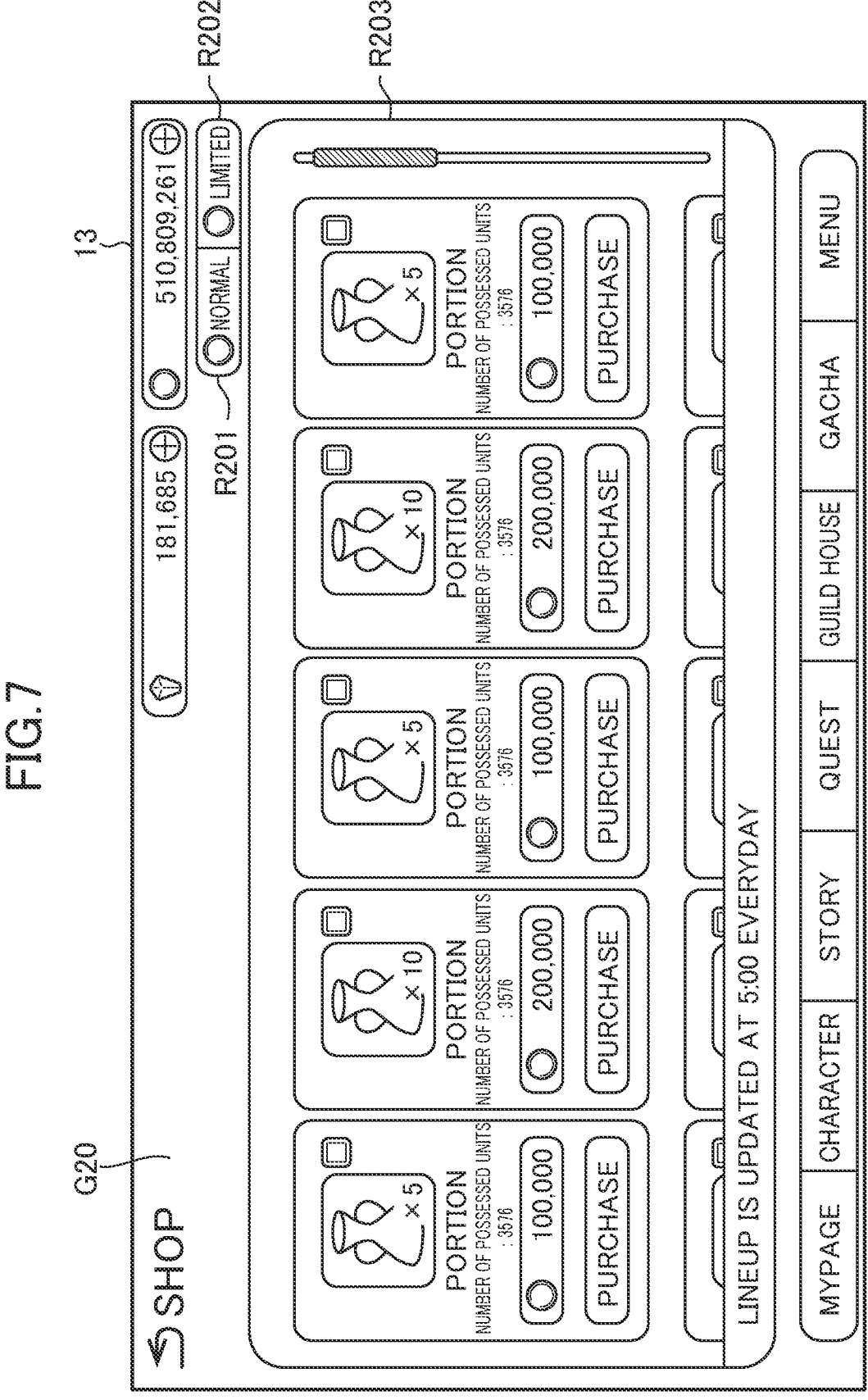
FIG. 7 shows one example of a shop screen.
Figure 8:
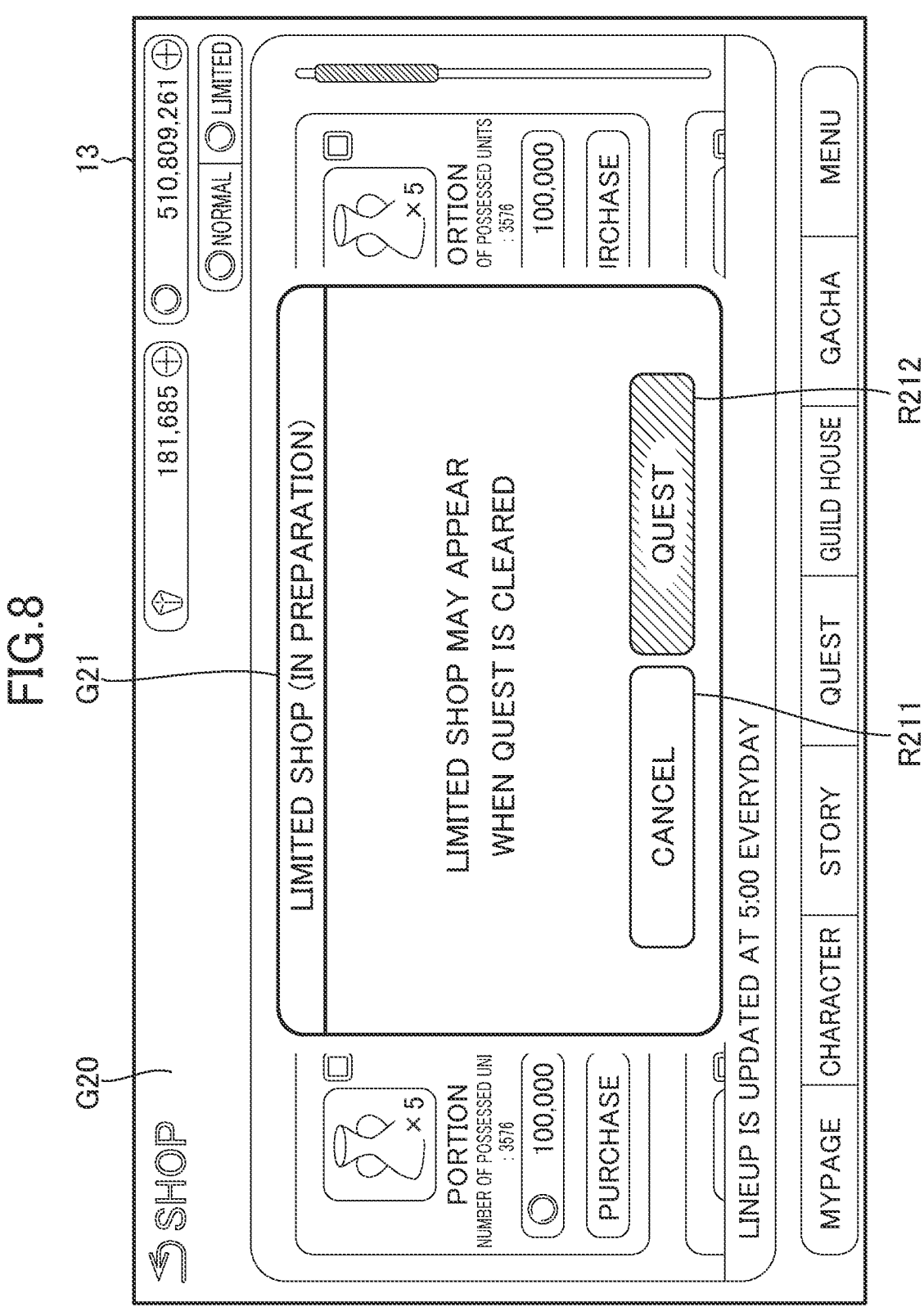
FIG. 8 shows one example of a pop-up notification screen.

In the example shown in FIG. 7, the shop screen G20 includes and displays, therein, a normal-shop function selection region R201, a limited-shop function selection region R202, and a shop display region R203. The normal-shop function selection region R201 displays an object, such as a tab or a button, for displaying a normal shop (not shown) in the shop display region R203 when the normal-shop function selection region R201 is selected. In the normal shop, information related to normal items, such as the names of the normal items, images thereof, and the amounts required for purchase, is displayed, whereby the player can select and purchase a normal item(s) in the normal-shop screen. The limited-shop function selection region R202 displays an object, such as a tab or a button, for displaying a limited shop in the shop display region R203 when the limited-shop function selection region R202 is selected. Specifically, the limited-shop function selection region R202 is active with respect to a player's operation during the limited period. In one example, the game control unit 23 makes the limited shop displayed in the shop display region R203 when the limited-shop function selection region R202 is selected by the player. On the other hand, the limited-shop function selection region R202 is inactive with respect to a player's operation, outside the limited period. In one example, when the limited-shop function selection region R202 is selected by the player, the game control unit 23 makes a pop-up notification screen G21 for notifying limited-shop release information, displayed on the shop screen G20, as shown in FIG. 8. In the pop-up notification screen G21, a close button R211 and a quest screen transition button R212 may be displayed. The close button R211 is a button for closing the pop-up notification screen G21 when this button is pressed by the player. The quest screen transition button R212 is a button for transition to the quest (the first content). When the quest screen transition button R212 is pressed, the game control unit 23 makes the shop screen G20 disappear from the screen of the display device 13 and causes the main screen related to the first content to be newly displayed. Outside the limited period, the limited-shop function selection region R202 may be displayed while being grayed out in order to indicate that this region is inactive.

In the case where the determination unit 24 determines that the release condition has been satisfied, the game control unit 23 may also make the display device 13 superimpose a pop-up display screen (not shown) for notifying that the second content is executable, before making the display device 13 display the screen related to the second content. The pop-up display screen is displayed on the main screen G1. In the case where the pop-up display screen is displayed, it is possible that, after making this screen displayed to notify the player that the second content can be executed, the game control unit 23 automatically makes the pop-up screen G2 superimposed on the main screen G1 or makes the pop-up screen G2 superimposed on the main screen G1 upon acceptance of player's operations for closing the pop-up display screen and for displaying the pop-up screen G2.

The determination unit 24 is configured to include the processor 11 and determines whether the release condition for allowing the second content different from first content to be executable has been satisfied, on the basis of execution of the first content performed by the game control unit 23. In this embodiment, this release condition is to win the lottery game included in the first content. The determination unit 24 obtains a lottery result of the lottery game in the first content and determines whether the lottery result shows a win or a loss. In one example, the game control unit 23 generates, as the lottery result, lottery-result information indicating a win with 1 or a loss with 0, and the determination unit 24 obtains the lottery-result information, determines that the release condition has been satisfied in the case where this information indicates 1, and determines that the release condition has not been satisfied in the case where this information indicates 0. In the case where the determination unit 24 determines that the release condition has been satisfied, the determination unit 24 sends release permission information for the second content to the game control unit 23.

[Operation]

Figure 9:
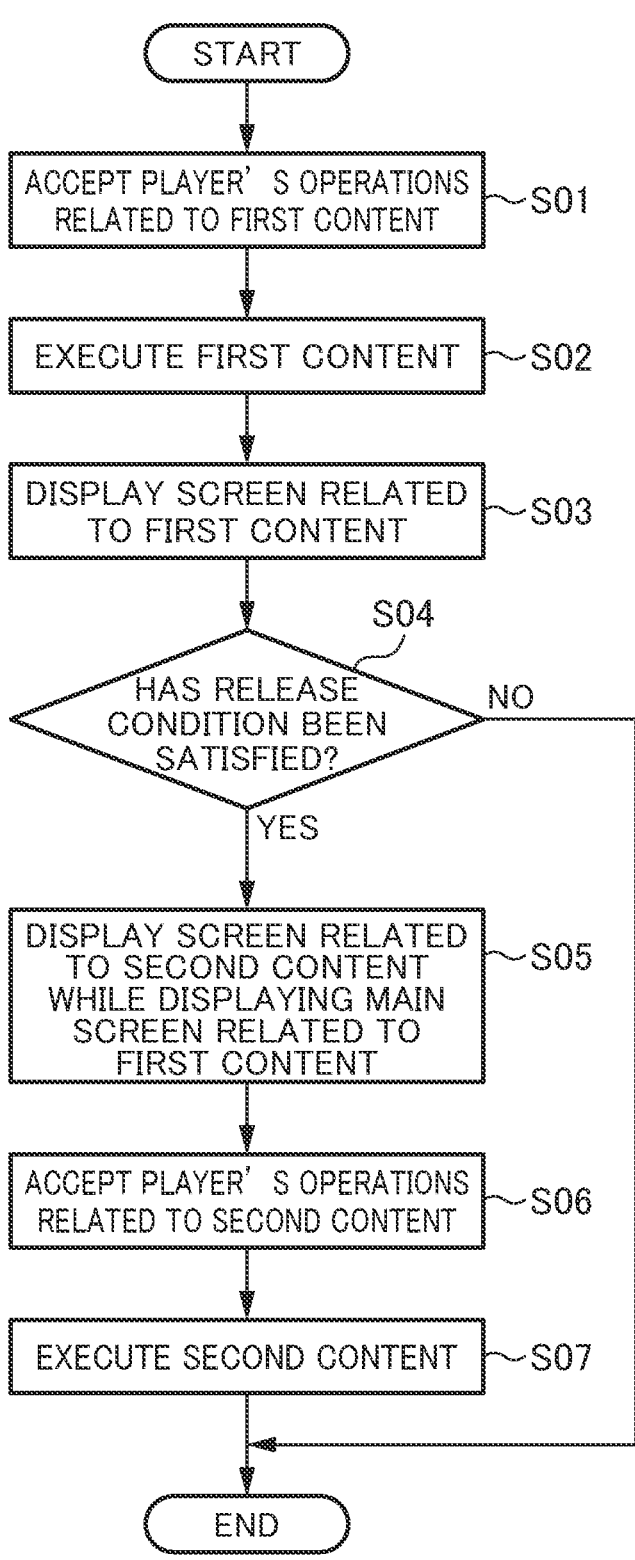
FIG. 9 shows one example of an operation flowchart of the electronic device according to the embodiment of the present invention.

FIG. 9 is one example of an operation flowchart of the electronic device according to the embodiment of the present invention.

The electronic device 10 accepts player's operations related to the first content via the input device 12 (S01), executes the first content by means of the game control unit 23 (S02), and makes the display device 13 display a screen related to the first content (S03). Specifically, the game control unit 23 accepts the respective player's operations for selecting a quest and for organizing characters to be made to participate in the quest, via the input device 12 in Step S01, executes the quest to obtain and generate information required for display of the main screen G1 to be displayed on the display device 13, in Step S02, and makes the display device 13 display the proceeding of the quest and the result thereof in Step S03. Note that the game control unit 23 may also accept a character operation from the player during the proceeding of the quest.

After the player clears the quest, while the game control unit 23 makes the display device 13 display a screen indicating quest clear as a screen related to the first content, the game control unit 23 executes the lottery game as the first content to generate lottery-result information. The determination unit 24 obtains the lottery-result information and determines whether the release condition for allowing the second content to be executable has been satisfied, on the basis of this information (S04). In the case where the determination unit 24 determines that the release condition has not been satisfied (NO in S04), the flowchart ends. In the case where the determination unit 24 determines that the release condition has been satisfied (YES in S04), the determination unit 24 sends release permission information for the second content to the game control unit 23, and the game control unit 23 makes the display device 13 display a screen related to the second content while making the display device 13 display the main screen related to the first content (S05). In this embodiment, the screen related to the second content is the pop-up screen G2 related to the limited shop and is superimposed on the main screen G1. That is, in order to display the pop-up screen G2 on the display device 13, the main screen G1 does not disappear from the screen of the display device 13.

The electronic device 10 accepts player's operations related to the second content via the input device 12 (S06) and executes the second content by means of the game control unit 23 (S07). Specifically, the player's operations are operations related to selection, change, and purchase of a limited item(s). Through execution of the second content, the player can obtain the selected limited item(s). After the second content is executed in this way, the flowchart ends.

[Action/Effect]

(1) The electronic device 10 of this embodiment is an electronic device that includes the display device 13 and that executes a game. The electronic device 10 has the game control unit 23, which executes content of the game and which makes the display device 13 display a screen related to the content; and the determination unit 24, which determines whether the release condition for allowing the second content different from the first content to be executable has been satisfied, on the basis of execution of the first content performed by the game control unit 23. The display device 13 displays a screen related to the second content while displaying the main screen G1 related to the first content, in the case where the determination unit 24 determines that the release condition has been satisfied.

Accordingly, it is possible to maintain a player's sense of immersion in the game. In particular, in the first content, such as a quest in which the fighting power of the player is strengthened by collecting game media such as weapons and items with a fixed probability when an enemy character is defeated, there are cases where a so-called grinding play for repeating battle, many times, with the same enemy character in order to collect weapons etc. is scheduled. Even in the case where the player performs a grinding play for repeatedly performing the first content, since the screen related to the second content is displayed while the main screen G1 related to the first content is displayed, it is possible to eliminate: the need to make everything about the first content disappear from the display screen and to display the second content on the screen, i.e., the need to perform a so-called screen transition, which was conventionally performed; and the need that the player reselects the first content again after the screen transition, to make the first content displayed again on the screen. Thus, it is possible to improve the tempo of the proceeding of the first content, to enable an efficient grinding play, and to maintain a sense of immersion in the game.

In this embodiment, although the game control unit 23 makes the display device 13 display the progression of the first content (quest) as one example of the main screen G1, it is also possible that the player uses a predetermined item at the beginning of execution of the first content, thereby eliminating the display of the progression of the first content on the display device 13. Accordingly, it is possible to reduce the processing time, amount of processing, and battery consumption until completion of execution of the first content, and the player can enjoy the game.

(2) The game control unit 23 makes the display device 13 superimpose the pop-up screen G2 related to the second content over the main screen G1 related to the first content displayed on the display device 13.

Accordingly, it is possible to attract the player's attention to the second content and to complete a play of the second content in the pop-up screen G2.

(3) In the case where the determination unit 24 determines that the release condition has been satisfied, the game control unit 23 makes the display device 13 superimpose the pop-up display screen for notifying that the second content is executable, before making the display device 13 display the screen related to the second content. Accordingly, it is possible to make the player aware that the second content is playable.

(4) The game control unit 23 can execute the second content only during the limited period. Accordingly, it is possible to lead the player to the second content.

(5) In the case where the determination unit 24 determines again that the release condition has been satisfied after the determination unit 24 determines that the release condition has been satisfied, the game control unit 23 makes the display device 13 display a screen related to the second content in which components have been changed. Accordingly, it is possible to arouse the player's interest in the new second content.

[Embodiment Realized by System]

Figure 10:
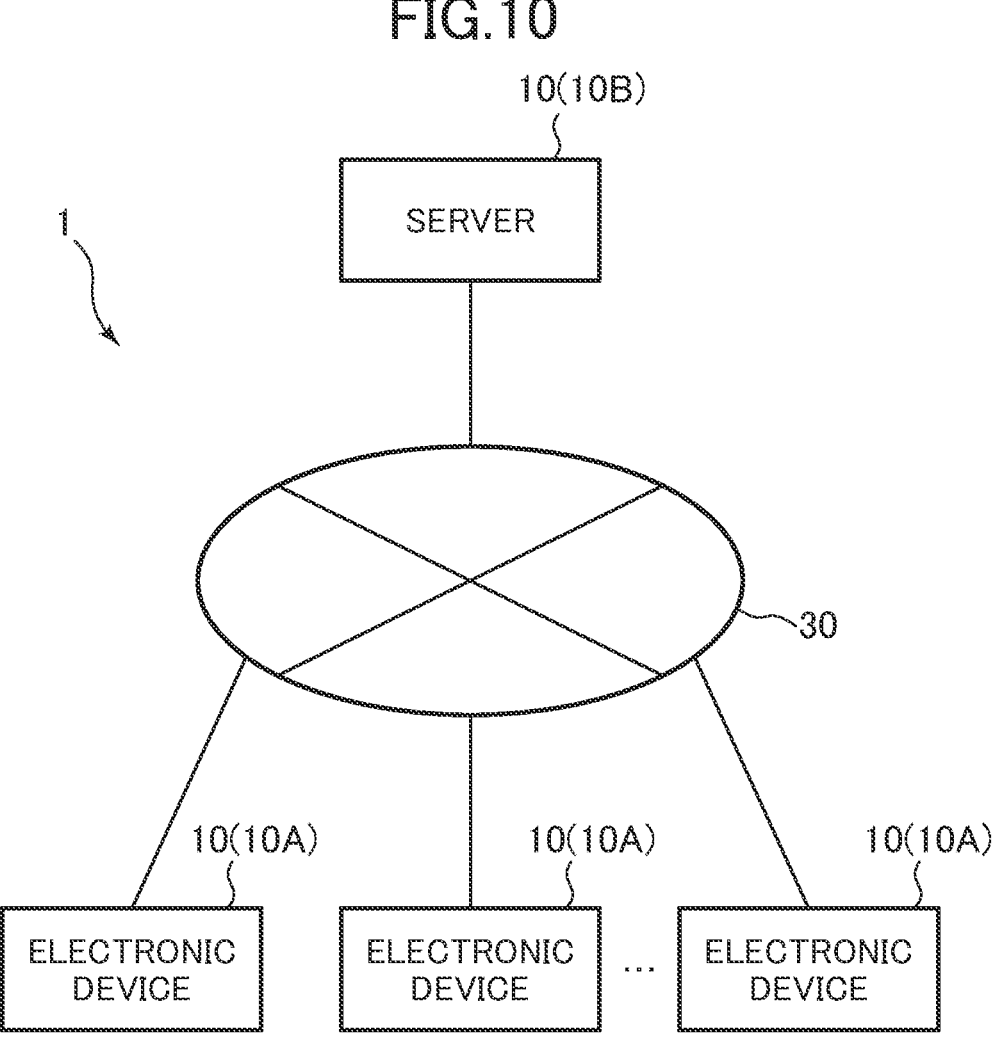
FIG. 10 is a view showing one example of the overall configuration of a game system according to one embodiment of the present invention.

FIG. 10 is a view showing one example of the overall configuration of a game system according to one embodiment of the present invention. As shown in FIG. 10, a game system 1 includes a plurality of electronic devices 10A and a server 10B. The electronic devices 10A are user terminals used by individual players and are also called user terminals 10A. The user terminals 10A and the server 10B are connected to a network 30 such as the Internet so as to be able to communicate with one another. Note that, although the game system 1 of this embodiment will be described on the assumption that the game system 1 is a server-client system, the game system 1 may be configured by a system that does not include the server 10B, as in PtoP.

The user terminals 10A and the server 10B each include the hardware configuration similar to that of the electronic device 10 shown in FIG. 1. In other words, one aspect of the electronic device 10 is each of the user terminals 10A, and another aspect thereof is the server 10B. The user terminal 10A is a smartphone also in this embodiment. The server 10B is configured of one or a plurality of computers that provide games reproducible at the user terminals 10A.

The server 10B stores various programs, such as a control program for controlling the proceeding of an online game, and various kinds of data used in games. The server 10B sends data to and receives data from the user terminals 10A regularly or as needed, to proceed with the games.

In one example, each of the user terminals 10A downloads a game application executable at this terminal 10A from the server 10B. Each of the user terminals 10A accepts operations related to the game content and sends information related to the operations to the server 10B. The server 10B has the entirety or a portion of the function of the game control unit 23, executes the game content, sends an execution result and information required for display at the user terminal 10A to the user terminal 10A, and makes the display device 13 of the user terminal 10A display information related to the game content on the screen thereof.

Specifically, the user terminal 10A executes the application downloaded from the server 10B, makes the display device 13 display a quest selection screen and a game-medium organization screen, accepts a player operation to select a quest, a player operation to select game media to be made to participate in this quest, and a player operation to start this quest, via the input device 12, and sends information related to these operations to the server 10B via the communication device 15.

The server 10B executes the content (first content) of the quest on the basis of the received information related to the operations, and appropriately sends information related to the proceeding of the quest and required to be displayed on the display device 13 of the user terminal 10A, to the user terminal 10A via the communication device 15. The user terminal 10A displays a screen related to the quest on the display device 13 thereof. Note that it is also possible that the user terminal 10A accepts player's operations with respect to characters of the player during the progress of the quest, and the server 10B executes the quest (first content) on the basis of the operations. When the quest is cleared, the server 10B sends information indicating quest clear (the information may include information related to a reward) to the user terminal 10A, and the user terminal 10A displays a screen showing the quest clear on the display device 13 as a main screen related to the first content.

At the server 10B, the game control unit 23 executes a lottery game in accordance with the quest clear, and the determination unit 24 determines whether the release condition has been satisfied. In the case where the determination unit 24 of the server 10B determines that the release condition has been satisfied, the game control unit 23 of the server 10B executes the limited shop (second content) and sends information required to display the limited shop to the user terminal 10A, and the display device 13 of the user terminal 10A displays a screen (for example, the pop-up screen G2) related to the limited shop while displaying the main screen G1.

Next, the user terminal 10A accepts player's operations, such as an item selection operation for a limited item(s) etc. and a purchase operation, and sends information related to these operations to the server 10B, the server 10B executes the limited shop (second content) and sends information required for display of the purchase confirmation screen G3 to the user terminal 10A, and the user terminal 10A displays the purchase confirmation screen G3 on the display device 13. Then, the user terminal 10A accepts an operation to give a consent to purchase and sends this operation information to the server 10B. The server 10B sends information required for display of the purchase completion screen G4 to the user terminal 10A on the basis of the purchase consent operation of the player, and the user terminal 10A displays the purchase completion screen G4 and closes the purchase completion screen G4 through an operation to close the purchase completion screen G4.

In the case where the server 10B executes the first content again after executing the second content, at least part of data related to display of the first content used up to last time is kept in the storage device 14, such as a memory, of the user terminal 10A, whereby at least part of communication of the data related to the first content with the server 10B is unnecessary when the player selects the first content again, and it is possible to achieve a reduction in communication traffic and a reduction in time, electric power, and server load associated with this communication.

In the above-described example, although the user terminal 10A is made to function as an interface with respect to the player, that is, as the input device 12 and the display device 13, and the server 10B is made to function as the game control unit 23 and the determination unit 24, it is also possible that execution of a portion or the entirety of the first content and the second content and/or determination of the release condition is performed at the game control unit 23 and/or the determination unit 24 of the user terminal 10A. For example, the lottery game included in the first content may be executed at the user terminal 10A. In this way, information processing, operations, and communications related to the first content and the second content may be shared between the user terminal 10A and the server 10B.

In another example, the server 10B is a web server and provides a game service to the user terminal 10A. The user terminal 10A obtains HTML data for displaying a web page from the server 10B, analyzes the obtained HTML data, and displays the web page. In this case, the server 10B, which communicates with the user terminal 10A, has the entirety or a portion of the function of the game control unit 23. For example, the user terminal 10A accepts a player's operation via the input device 12 and displays execution results of the first content and the second content executed by the server 10B, on the display device 13 of the user terminal 10A.

Other Embodiments

In another embodiment of the present invention, it is also possible to provide a program that realizes the functions and the information processing shown in the flowchart of the above-described embodiment of the present invention and a computer-readable storage medium that has stored the program. Furthermore, in still another embodiment, it is also possible to provide a method that realizes the functions and the information processing shown in the flowchart of the above-described embodiment of the present invention. Furthermore, in still another embodiment, it is also possible to provide a server that can supply, to a computer, a program that realizes the functions and the information processing shown in the flowchart of the above-described embodiment of the present invention. Furthermore, in still another embodiment, it is also possible to provide a virtual machine that realizes the functions and the information processing shown in the flowchart of the above-described embodiment of the present invention.

The processing or operation described above can be modified freely as long as no inconsistency arises in the processing or operation, such as an inconsistency that a certain step utilizes data that may not yet be available in that step. Furthermore, the examples described above are examples for explaining the present invention, and the present invention is not limited to those examples. The present invention can be embodied in various forms as long as there is no departure from the gist thereof.

For example, in the second content, not only limited items but also items that are available for purchase in the normal shop may be made to be available for purchase. In one example, not only limited items but also normal items that are available for purchase in the normal shop may also be displayed to be available for purchase in the screen related to the second content (for example, the pop-up screen G2). In another example, the second content may also include not only the limited shop but also the normal shop. Specifically, it is also possible that shop switch objects, such as a limited-shop tab and a normal-shop tab, are displayed in the screen related to the second content (for example, the pop-up screen G2), and items may be made to be available for purchase in the respective shops in response to a player's selection or it is also possible that a normal-shop button is displayed in the screen related to the second content (for example, the pop-up screen G2), and a pop-up screen for the normal shop is superimposed on the main screen G1, separately from the pop-up screen G2 for the limited shop, when this button is selected.

The second content just needs to be different from the first content, and may also be the same type of content as the first content. For example, in the above-described embodiment, although the first content includes the quest and the lottery game, and the second content includes the limited shop, the second content may also include a limited quest to be released for a limited period only. For example, it is also possible that a screen related to the limited quest (the pop-up screen G2) is superimposed on the screen of the quest of the first content (the main screen G1), and the proceeding of this limited quest is displayed in the screen related to the limited quest. The limited quest is set to a quest with a higher rarity value than a quest executed in the first content, thereby making it possible to enhance the fun of the game. Furthermore, it is also possible that the first content includes the normal shop and the lottery game, and the second content includes the limited shop. Furthermore, the release condition may be to win the lottery game as in the above-described embodiment or may be a predetermined condition. This predetermined condition can be set to a challenge that is executable by the player when the first content is executed. Furthermore, instead of the quest of the first content, it is also possible to execute a game-medium lottery game that is so-called "gacha", in which a character and/or an item is obtained by lottery. In this case, after the lottery of the game-medium lottery game, it is possible to execute a lottery game for determining whether the release condition has been satisfied. Note that, in this case, the second content may also be the limited quest instead of the limited shop.

In the example shown in FIG. 4, in the pop-up screen G2, since a list of all items of item information treated in the limited shop cannot be displayed, a scroll bar is provided therein to allow the all items of item information to be checked through a player's scroll operation; however, it is also possible to provide, in the pop-up screen G2, a button for displaying another pop-up screen G2. Accordingly, the player can check all items of item information treated in the limited shop, with the plurality of pop-up screens G2.

REFERENCE SIGNS LIST

1 game system
10 electronic device
10A user terminal
10B server
11 processor
12 input device
13 display device
14 storage device
15 communication device
16 bus
21 input unit
22 display unit
23 game control unit
24 determination unit
30 network
G1 main screen related to first content
G2 pop-up screen
G3 purchase confirmation screen
G4 purchase completion screen
G20 shop screen
G21 pop-up notification screen
R21 limited-shop notification region
R22 limited-shop release-count display region
R23 item-information display region
R231 selection box
R232 purchase button
R24 currency-amount display region
R25 cancel button
R26 selected-item purchase button
R31 selected-item information display region
R32 possessed-currency-amount display region
R33 cancel button
R34 consent button
R41 close button
R201 normal-shop function selection region
R202 limited-shop function selection region
R203 shop display region
R211 close button
R212 quest screen transition button

The invention claimed is:

1. A non-transitory computer readable medium storing a program for a game to be executed on an electronic device including a display device, the program being configured to perform a method comprising:

executing first content of the game;

making the display device display a screen related to the first content;

determining whether a release condition for allowing second content of the game that is different from the first content has been satisfied based on executing the first content;

wherein executing the first content comprises making the display device display a main screen related to the first content;

making the display device display a screen related to the second content while making the display device display the main screen related to the first content, in response to determining that the release condition has been satisfied; and making the display device superimpose a first pop-up screen related to the second content over the main screen related to the first content displayed on the display device.

2. The non-transitory computer readable medium according to claim 1, wherein the method further comprises making the display device superimpose a second pop-up screen for notifying that the second content is executable, before making the display device display the screen related to the second content in response to determining that the release condition has been satisfied.

3. The non-transitory computer readable medium according to claim 1, wherein executing the second content is performed only during a limited period.

4. The non-transitory computer readable medium according to claim 1, wherein, in response to determining again that the release condition has been satisfied after determining that the release condition has been satisfied, the display device displays a screen related to the second content in which components have been changed.

5. The non-transitory computer readable medium according to claim 1, wherein the second content is a shop in which, among items that are used in the game by a player, at least limited items can be purchased.

6. A method for a game to be executed on an electronic device including a display device, the method comprising:

executing first content of the game;

making the display device display a screen related to the first content;

determining whether a release condition for allowing second content of the game that is different from the first content has been satisfied based on executing the first content, wherein executing the first content comprises making the display device display a main screen related to the first content;

in response to determining that the release condition has been satisfied, making the display device display a screen related to the second content while being made to display the main screen related to the first content; and making the display device superimpose a pop-up screen related to the second content over the main screen related to the first content displayed on the display device.

7. An electronic device that includes a display device and that executes a game, the electronic device comprising:

a processor; and a memory connected to the processor, wherein the memory comprises a program configured to, when executed by the processor, perform a method comprising:

executing first content of the game;

making the display device display a screen related to the first content;

determining whether a release condition for allowing second content of the game that is different from the first content has been satisfied based on executing the first content, wherein executing the first content comprises making the display device display a main screen related to the first content;

in response to determining that the release condition has been satisfied, making the display device display a screen related to the second content while being made to display the main screen related to the first content; and making the display device superimpose a pop-up screen related to the second content over the main screen related to the first content displayed on the display device.

8. A system comprising:

an electronic device comprising a processor, a memory, and a display device, wherein the memory comprises a program configured to, when executed by the processor, perform a method comprising:

executing first content of a game;

making the display device display a screen related to the first content;

determining whether a release condition for allowing second content of the game that is different from the first content has been satisfied based on executing the first content, wherein executing the first content comprises making the display device display a main screen related to the first content;

in response to determining that the release condition has been satisfied, making the display device display a screen related to the second content while being made to display the main screen related to the first content; and making the display device superimpose a pop-up screen related to the second content over the main screen related to the first content displayed on the display device.

* * * * *